US012635026B2

(12) United States Patent
Chang et al.

(10) Patent No.: US 12,635,026 B2
(45) Date of Patent: *May 19, 2026

(54) RRC CONNECTION REJECT HANDLING UNDER L2 RELAYING

(71) Applicant: Kyocera Corporation, Kyoto (JP)

(72) Inventors: Henry Chang, San Diego, CA (US); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 303 days.

This patent is subject to a terminal disclaimer.

(21) Appl. No.: 18/279,189

(22) PCT Filed: Mar. 1, 2022

(86) PCT No.: PCT/US2022/018252
§ 371 (c)(1),
(2) Date: Aug. 28, 2023

(87) PCT Pub. No.: WO2022/187186
PCT Pub. Date: Sep. 9, 2022

(65) Prior Publication Data
US 2024/0147547 A1     May 2, 2024

Related U.S. Application Data

(60) Provisional application No. 63/270,359, filed on Oct. 21, 2021, provisional application No. 63/155,206, filed on Mar. 1, 2021.

(51) Int. Cl.
*H04W 76/20* (2018.01)
*H04W 76/10* (2018.01)
(Continued)

(52) U.S. Cl.
CPC ........... *H04W 76/20* (2018.02); *H04W 76/10* (2018.02); *H04W 76/19* (2018.02); *H04W 88/04* (2013.01); *H04W 92/18* (2013.01)

(58) Field of Classification Search
CPC ..... H04W 76/20; H04W 76/10; H04W 76/19; H04W 88/04; H04W 92/18; H04W 76/14; H04W 76/18
See application file for complete search history.

(56) References Cited

U.S. PATENT DOCUMENTS

2019/0394816 A1     12/2019 Kim
2020/0221532 A1     7/2020 Jung et al.
(Continued)

FOREIGN PATENT DOCUMENTS

KR     10-2019-0033846 A     4/2019
KR     10-2020-0087057 A     7/2020
WO     2021-034126 A1     2/2021

*Primary Examiner* — Michael K Phillips
(74) *Attorney, Agent, or Firm* — Studebaker Brackett PLLC

(57) ABSTRACT

The devices, systems, and methods discussed herein facilitate the transition of a remote UE device and a relay UE device from either the RRCJDLE state or the RRCJNACTIVE state to the RRC_CONNECTED state in order to relay data. In some examples, in response to receiving a first Radio Resource Control (RRC) message from the remote UE device requesting connection to a base station, the relay UE device transmits an RRC connection request message to the base station. If the relay UE device receives a favorable RRC response message from the base station, the relay UE device transitions to the RRC_CONNECTED state with the base station and forwards the first RRC message to the base station. In some examples, the relay UE device transmits, to the remote UE device, a status update message to inform the remote UE device of the RRC response message received from the base station.

19 Claims, 5 Drawing Sheets

(51) Int. Cl.
    *H04W 76/19*       (2018.01)
    *H04W 88/04*       (2009.01)
    *H04W 92/18*       (2009.01)

(56)                References Cited

U.S. PATENT DOCUMENTS

| | | | |
|---|---|---|---|
| 2020/0229007 A1 | 7/2020 | Jung et al. | |
| 2021/0314979 A1 | 10/2021 | Agiwal et al. | |
| 2022/0338092 A1 | 10/2022 | Wang | |
| 2023/0180313 A1* | 6/2023 | Freda | H04W 76/14 |
| | | | 370/310 |
| 2023/0189059 A1* | 6/2023 | Ahmad | H04W 40/22 |
| | | | 370/235 |
| 2023/0361926 A1 | 11/2023 | Babaei | |
| 2024/0049327 A1* | 2/2024 | Cai | H04W 76/19 |
| 2024/0137995 A1* | 4/2024 | Cai | H04W 76/20 |
| 2024/0147563 A1* | 5/2024 | Chang | H04W 76/20 |
| 2024/0155709 A1* | 5/2024 | Yu | H04W 76/11 |
| 2024/0163935 A1* | 5/2024 | Cheng | H04W 76/10 |
| 2024/0215082 A1* | 6/2024 | Zhang | H04W 76/10 |
| 2024/0224366 A1 | 7/2024 | Zhang | |

* cited by examiner

RRC CONNECTION REJECT HANDLING UNDER L2 RELAYING

CLAIM OF PRIORITY

The present application claims priority to Provisional Application No. 63/155,206, entitled "RRC STATE TRANSITIONS IN L2 RELAYING," filed Mar. 1, 2021, and to Provisional Application No. 63/270,359, entitled "RRC CONNECTION REJECT HANDLING UNDER L2 RELAYING," filed Oct. 21, 2021, both of which are assigned to the assignee hereof and hereby expressly incorporated by reference in their entirety.

FIELD

This invention generally relates to wireless communications and more particularly to a wireless communication device undergoing a state transition while acting as a relay between two other wireless communication devices.

BACKGROUND

Sidelink relaying functionality allows a remote user equipment (UE) device that is out-of-coverage (OoC) to connect with the gNB or base station via a relay UE device.

SUMMARY

The devices, systems, and methods discussed herein facilitate the transition of a remote UE device and a relay UE device from either the RRC_IDLE state or the RRC_INACTIVE state to the RRC_CONNECTED state in order to relay data. In some examples, in response to receiving a first Radio Resource Control (RRC) message from the remote UE device requesting connection to a base station, the relay UE device transmits an RRC connection request message to the base station, if the relay UE device is initially in either the RRC_IDLE state or the RRC_INACTIVE state. If the relay UE device receives a successful RRC response message from the base station, the relay UE device transitions to the RRC_CONNECTED state with the base station and forwards the first RRC message to the base station. However, in some cases, the relay UE device experiences connection failure while it attempts to connect to the base station. In this situation, the remote UE device is informed of the relay UE device's connection failure. In some examples, the relay UE device transmits, to the remote UE device, a status update message to inform the remote UE device of the RRC response message received from the base station.

DETAILED DESCRIPTION

Figure 1:
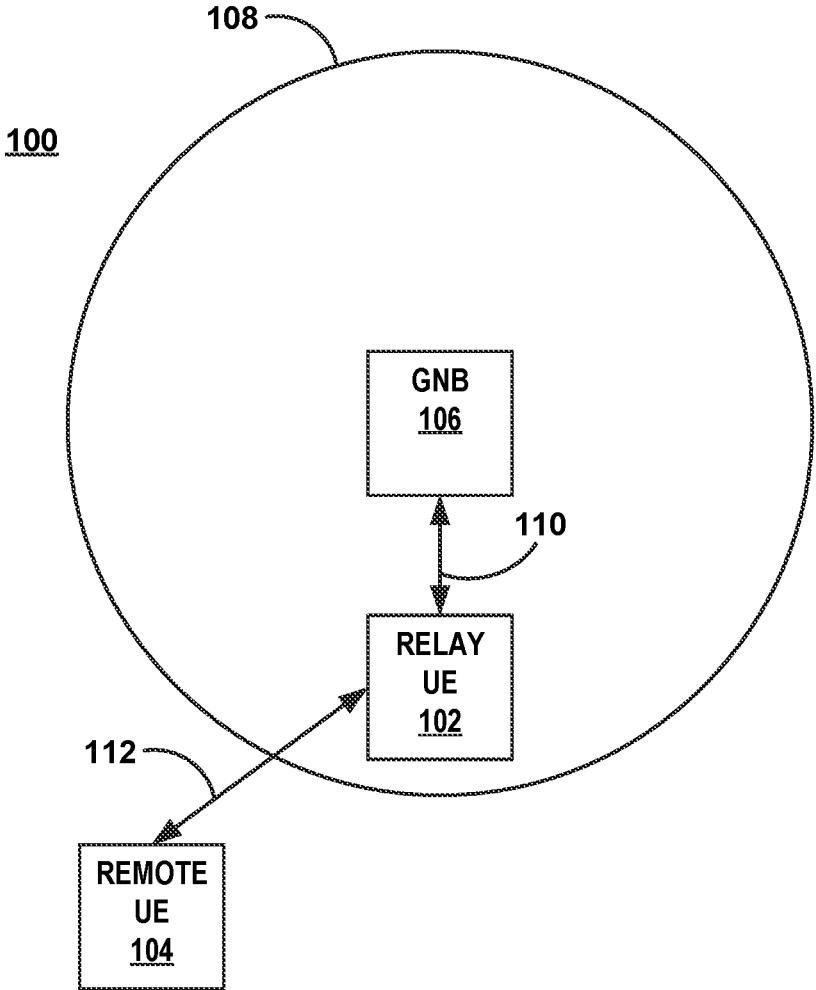
FIG. 1 is a block diagram of an example of a system in which a relay user equipment (UE) device acts as a relay between a base station and a remote UE device.

There are two types of sidelink relaying: UE-to-Network (U2N) relaying and UE-to-UE (U2U) relaying. For U2N relaying, both the relay UE and remote UE may be in coverage, but in other cases, the relay UE is in coverage while the remote UE is out-of-coverage (OoC), as shown in the example of FIG. 1. Therefore, for U2N relaying, the relay UE needs to be in coverage of a cell and connected to the gNB that provides wireless services within the cell. With U2U relaying, there is no such restriction. Thus, for U2U relaying, the relay UE may be in coverage or OoC of the cell.

For U2N relaying, relaying of unicast data between the remote UE and the network can occur after a PC5-RRC connection is established between the relay UE and the remote UE. In this context, PC5 refers to an interface that allows UEs to communicate directly with each other over a direct channel. Thus, communication over the PC5 interface does not require communication with the base station. RRC refers to the Radio Resource Control (RRC) protocol that facilitates the following functionality: connection establishment and release functions, broadcast of system information, radio bearer establishment, and reconfiguration and release.

There are also two types of RRC layers used for connection control. PC5-RRC refers to the connection control protocol used strictly in the PC5 link, while the RRC is the connection control protocol used between the base station and the UE. In the case of the remote UE device, the remote UE device manages both types of RRCs. The PC5-RRC layer is the connection control protocol over the PC5 link between the remote UE device and the relay UE device, while the remote UE device's RRC layer manages the connection control protocol with the gNB.

In some examples, it is assumed that the relay UE device does not need to decode the information within the remote UE device's RRC messages that are meant for the base station. The relay UE device simply forwards the remote UE device's RRC messages to the base station, and vice versa. Likewise, the relay UE device also has two RRC layers, one for the PC5 link and one for the Uu link.

In order to relay unicast data, the relay UE must be in the RRC_CONNECTED state with the base station. For a Level 2 (L2) UE-to-Network relay, the remote UE(s) must also be in the RRC_CONNECTED state with the base station to perform transmission/reception of relayed unicast data. However, when there is no ongoing unicast data being transmitted, both the relay UE and the remote UE may transition to other RRC states.

For example, the relay UE can be in the RRC_IDLE state, the RRC_INACTIVE state, or the RRC_CONNECTED state as long as all the PC5-connected remote UE(s) are in the RRC_IDLE state or the RRC_INACTIVE state. The relay UE can be in the RRC_INACTIVE state or the RRC_CONNECTED state as long as all the PC5-connected remote UE(s) are in the RRC_IDLE state or the RRC_INACTIVE state.

Although the remote UE and the relay UE are PC5-connected to each other, the UEs do not know each other's respective RRC states with regards to the gNB (e.g., base station). In particular, the remote UE's RRC state with the gNB is handled directly by the gNB, and in principle, it is only necessary for the gNB and the remote UE to know the RRC state of the remote UE. Thus, in some examples, the RRC state of the remote UE to the gNB is not known by the relay UE.

In light of the foregoing, the gNB may send the remote UE to either the RRC_IDLE state or the RRC_INACTIVE state when there is no unicast data delivery between the remote UE and the gNB. Consequently, the gNB may also send the relay UE to either the RRC_IDLE state or the RRC_INACTIVE state, depending on the RRC state of the remote UE, assuming the relay UE does not have to be in the RRC_CONNECTED state for any other reason (e.g., such as its own data transmissions to the network). Since the RRC state transitions for both the remote UE and the relay UE are controlled by the gNB, it is up to the gNB to decide when to transition the relay UE out of the RRC_CONNECTED state as a result of the remote UE transitioning out of the RRC_CONNECTED state. Once the relay UE and the remote UE are no longer in the RRC_CONNECTED state but are still PC5-connected, there is a need to transition both UEs back to the RRC_CONNECTED state in order to relay data between the remote UE and the gNB.

The devices, systems, and methods discussed herein facilitate the transition of a remote user equipment (UE) device and a relay UE device from either the RRC_IDLE state or the RRC_INACTIVE state to the RRC_CON-NECTED state in order to relay data. In some examples, in response to receiving a first Radio Resource Control (RRC) message from the remote UE device requesting connection to a base station, the relay UE device transmits an RRC connection request message to the base station. If the relay UE device receives a favorable RRC response message from the base station, the relay UE device transitions to the RRC_CONNECTED state with the base station and for-wards the first RRC message to the base station. In some examples, the relay UE device transmits, to the remote UE device, a status update message to inform the remote UE device of the RRC response message received from the base station.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

Figure 2A:
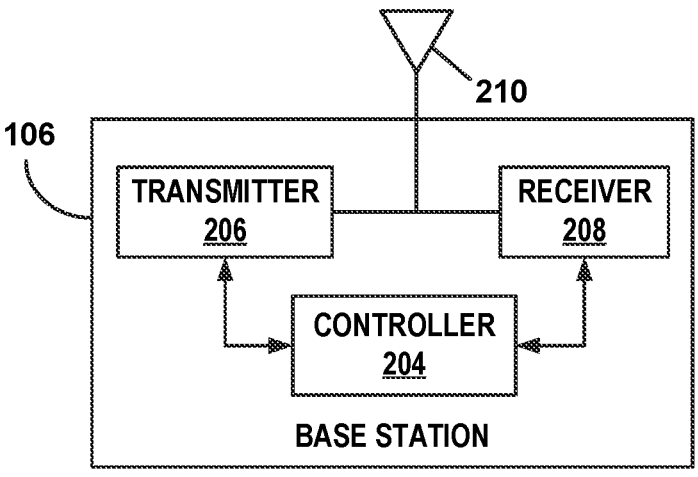
FIG. 2A is a block diagram of an example of the base station shown in FIG. 1.
Figure 2B:
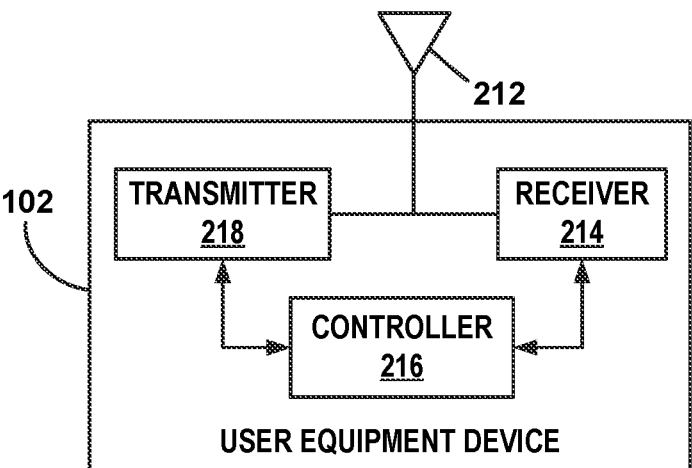
FIG. 2B is a block diagram of an example of the user equipment devices shown in FIG. 1.

FIG. 1 is a block diagram of an example of a system 100 in which a relay user equipment (UE) device acts as a relay between a base station and a remote UE device. In the interest of brevity, FIG. 1 only depicts one relay UE device 102 and one remote UE device 104. However, any number of relay UE devices and remote UE devices may be utilized, in other examples. As shown in FIG. 2B, user equipment device (UE) 102 comprises controller 216, transmitter 218, receiver 214, and antenna 212, as well as other electronics, hardware, and software code. Relay UE device 102 may also be referred to herein as a relay UE or as a relay wireless communication device (WCD). UE 102 is wirelessly con-nected to a radio access network (not shown) via base station 106, which provides various wireless services to UE 102. For the example shown in FIG. 1, UE 102 operates in accordance with at least one revision of the 3rd Generation Partnership Project 5G New Radio (3GPP 5G NR) commu-nication specification. In other examples, UE 102 may operate in accordance with other communication specifica-tions. For the example shown in FIG. 1, both of the UEs have the same components, circuitry, and configuration as UE 102 from FIG. 2B. However, any of the UEs in FIG. 1 may have components, circuitry, and configuration that differ from UE 102, in other examples.

UE 102 is any fixed, mobile, or portable equipment that performs the functions described herein. The various func-tions and operations of the blocks described with reference to UE 102 may be implemented in any number of devices, circuits, or elements. Two or more of the functional blocks may be integrated in a single device, and the functions described as performed in any single device may be imple-mented over several devices.

Controller 216 includes any combination of hardware, software, and/or firmware for executing the functions described herein as well as facilitating the overall function-ality of a user equipment device. An example of a suitable controller 216 includes software code running on a micro-processor or processor arrangement connected to memory. Transmitter 218 includes electronics configured to transmit wireless signals. In some situations, the transmitter 218 may include multiple transmitters. Receiver 214 includes elec-tronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and ampli-fiers. Other components may include isolators, matching circuits, and other RF components. These components in combination or cooperation with other components perform the user equipment device functions. The required compo-nents may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by trans-mitter 218. The demodulator demodulates received signals, in accordance with one of a plurality of modulation orders.

In the interest of clarity and brevity, only one base station is shown in FIG. 1. However, in other examples, any suitable number of base stations may be utilized. In the example of FIG. 1, base station 106 provides wireless services to UEs within coverage area 108. Although not explicitly shown, coverage area 108 may be comprised of multiple cells. For the example shown in FIG. 1, base station 106, sometimes referred to as a gNodeB or gNB, can receive uplink mes-sages from UE devices and can transmit downlink messages to the UE devices.

Base station 106 is connected to the network through a backhaul (not shown) in accordance with known techniques. As shown in FIG. 2A, base station 106 comprises controller 204, transmitter 206, receiver 208, and antenna 210 as well as other electronics, hardware, and code. Base station 106 is any fixed, mobile, or portable equipment that performs the functions described herein. The various functions and opera-tions of the blocks described with reference to base station 106 may be implemented in any number of devices, circuits, or elements. Two or more of the functional blocks may be integrated in a single device, and the functions described as performed in any single device may be implemented over several devices.

For the example shown in FIG. 2A, base station 106 may be a fixed device or apparatus that is installed at a particular location at the time of system deployment. Examples of such equipment include fixed base stations or fixed transceiver stations. In some situations, base station 106 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 106 may be a portable device that is not fixed to any particular location. Accordingly, base station 106 may be a portable user device such as a UE device in some circumstances.

Controller 204 includes any combination of hardware, software, and/or firmware for executing the functions described herein as well as facilitating the overall functionality of base station 106. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals that will be transmitted and can apply any one of a plurality of modulation orders. The demodulator demodulates any uplink signals received at base station 106 in accordance with one of a plurality of modulation orders.

For the example shown in FIG. 1, base station 106 and relay UE device 102 are connected by Uu link 110, which is the radio interface between a base station and a UE device. Relay UE device 102 and remote UE device 104 are connected by PC5 link 112, which is an interface that allows UEs to communicate directly with each other over a direct channel. Other suitable types of communication links may be utilized in system 100, in other examples.

In operation, when relay UE device 102 is in the RRC_INACTIVE state or the RRC_IDLE state and remote UE device 104 needs to request connection to base station 106, remote UE device 104 sends, via its transmitter 218 and antenna 212 over PC5 interface 112, a first Radio Resource Control (RRC) message requesting connection to base station 106. Relay UE device 102 receives the first RRC message via its antenna 212 and receiver 214.

In some examples, the first RRC message may be an RRC Resume Request message (e.g., when remote UE device 104 is in RRC_INACTIVE), an RRC Setup Request message (e.g., when remote UE device 104 is in RRC_IDLE), or an RRC Reestablishment Request message. In other examples, the first RRC message comprises a Sidelink Shared Channel (SL-SCH) subheader containing an indication that the first RRC message is intended for base station 106. In some examples, the Logical Channel Identification (LCID) field in the SL-SCH subheader is used by the relay UE device to identify the type of message that the relay UE device received from the remote UE device. In particular, the relay UE device identifies that the received message is a first RRC message that is intended for the base station. In some examples, the relay UE device is not required to decode the contents of the first RRC message. The identification of the first RRC message at the relay UE device will trigger the relay UE device to initiate its own connection to the base station.

For the purposes of the examples described herein, it is assumed that relay UE device 102 is not in the RRC_CONNECTED state with respect to base station 106. Thus, relay UE device 102 needs to establish its own connection with base station 106 before it can relay information between remote UE device 104 and base station 106. Thus, in response to receiving the first RRC message from remote UE device 104, relay UE device 102 transmits, via its transmitter 218 and antenna 212, an RRC connection request message to base station 106. In some examples, the RRC connection request message is an RRC Resume Request message (e.g., when relay UE device 102 is in RRC_INACTIVE) or RRC Setup Request message (e.g., when relay UE device 102 is in RRC_IDLE).

Relay UE device 102 utilizes its antenna 212 and receiver 214 to receive, from base station 106, an RRC response message. In some examples, the RRC response message is either an RRC Setup message or an RRC Reject message. If the RRC response message is an RRC Setup message, relay UE device 102 transitions to the RRC_CONNECTED state and forwards the first RRC message, which it received from remote UE device 104, to base station 106. Thus, in the examples in which base station 106 responds to relay UE device 102 with an RRC Setup message, relay UE device 102 sets up its own connection with base station 106 in order to relay information between remote UE device 104 and base station 106. In some examples, PC5 connection 112 between remote UE device 104 and relay UE device 102 remains active even when the UEs are not in the RRC_CONNECTED state with base station 106.

In other examples, the RRC response message received from base station 106 at relay UE device 102 is an RRC Reject message. In these cases, it is important to note that the rejection is towards the request from relay UE device 102 and not towards the request made by remote UE device 104. This can be seen by the fact that relay UE device 102 does not provide the first RRC message, which was received from remote UE device 104, along with its RRC connection request message to base station 106. Thus, base station 106 is unaware that remote UE device 104 is requesting connection.

In some examples, the RRC Reject message comprises a wait time and a relay wait time. The relay wait time indicates an amount of time that remote UE device 104 must wait before transmitting another message requesting connection to base station 106. In these examples, relay UE device 102 may transmit, to remote UE device 104, a PC5-RRC message containing (1) an RRC connection failure indicator, and (2) the relay wait time received in the RRC Reject message from base station 106. In some examples, the inclusion of a relay wait time in the PC5-RRC message is an implicit indicator of an RRC connection failure. In further examples in which a relay wait time is sent to remote UE device 104, remote UE device 104 does not transmit another message to relay UE device 102 requesting connection to base station 106 until a timer associated with the relay wait time expires.

In some examples, only the wait time is sent in the RRC Reject message. For example, base station 106 may not always assume that the connection request from relay UE device 102 is for the purpose of L2 relay operation (e.g., relay UE device 102 may have its own data to transmit to base station 106). Thus, in these cases, relay UE device 102 may include in the PC5-RRC message sent to remote UE device 104 the value of the wait time that was received from base station 106 (e.g., both relay UE device 102 and remote UE device 104 will apply the same wait time for their future connection requests). Additionally, base station 106 may optionally indicate whether the wait time sent in the RRC Reject message is also applicable for remote UE device 104.

In some examples, relay UE device 102 is permitted to retransmit the RRC connection request message after receiving an RRC Reject message from base station 106. In these examples, however, transmitter 218 of relay UE device 102 may be configured to refrain from transmitting the RRC connection request message more than a maximum number of allowable times configured by base station 106 (e.g., via System Information Block (SIB) messaging to the UE devices).

After sending the first RRC message requesting a connection to base station 106, remote UE device 104 awaits a response to its request. However, in the instances in which base station 106 rejects the RRC connection request from relay UE device 102, relay UE device 102 is unable to forward the request from remote UE device 104 to base station 106. Thus, remote UE device 106 awaits a response from base station 106, which relay UE device 102 is unable to provide.

In this scenario, there are a couple of different options. In some examples, relay UE device 102 transmits, via its transmitter 218 and antenna 212 to remote UE device 104, a status update message to inform remote UE device 104 of the RRC response message received from base station 106. To be clear, the RRC response message is the response to the relay UE device's connection request and not the remote UE device's connection request. In some examples, the status update message is one or more of the following: a PC5 release message, a PC5-RRC message containing an RRC connection failure indicator, and an RRC message forwarded from base station 106. One benefit of these examples of a status update message is that remote UE device 104 will know very quickly when its connection to base station 106 is not possible, allowing remote UE device 104 to perform relay reselection (e.g., to a relay connected to or camped on another base station).

In other examples, expiration of a timer is used to indicate a failure of the remote UE device's request for connection to the base station. For example, remote UE device 104 would wait until a timer expires, after which remote UE device 104 would transition to the RRC_IDLE state. In some examples, the timer may be T319 when the first RRC message was an RRC Resume Request. In other examples, the timer may be T300 when the first RRC message was an RRC Setup Request. In further examples, a new timer may be used specifically for this scenario. One benefit of these examples is that remote UE device 104 can simply wait until the timer expires before transitioning to the RRC_IDLE state and potentially choosing another relay UE device.

In other examples, remote UE device 104 is permitted to transmit, to relay UE device 102, additional RRC messages requesting connection to base station 106. In these examples, however, transmitter 218 of remote UE device 104 may be configured to refrain from transmitting these RRC messages more than a maximum number of allowable times configured by base station 106 (e.g., via SIB messaging forwarded to remote UE device 104 by relay UE device 102). After reaching the maximum number of allowable access attempts, the Access Stratum layer of remote UE device 104 will inform its upper layer that the maximum number of allowable access attempts has been reached, and remote UE device 104 will stop the access procedure with the cell on which relay UE device 102 is camped.

Figure 3:
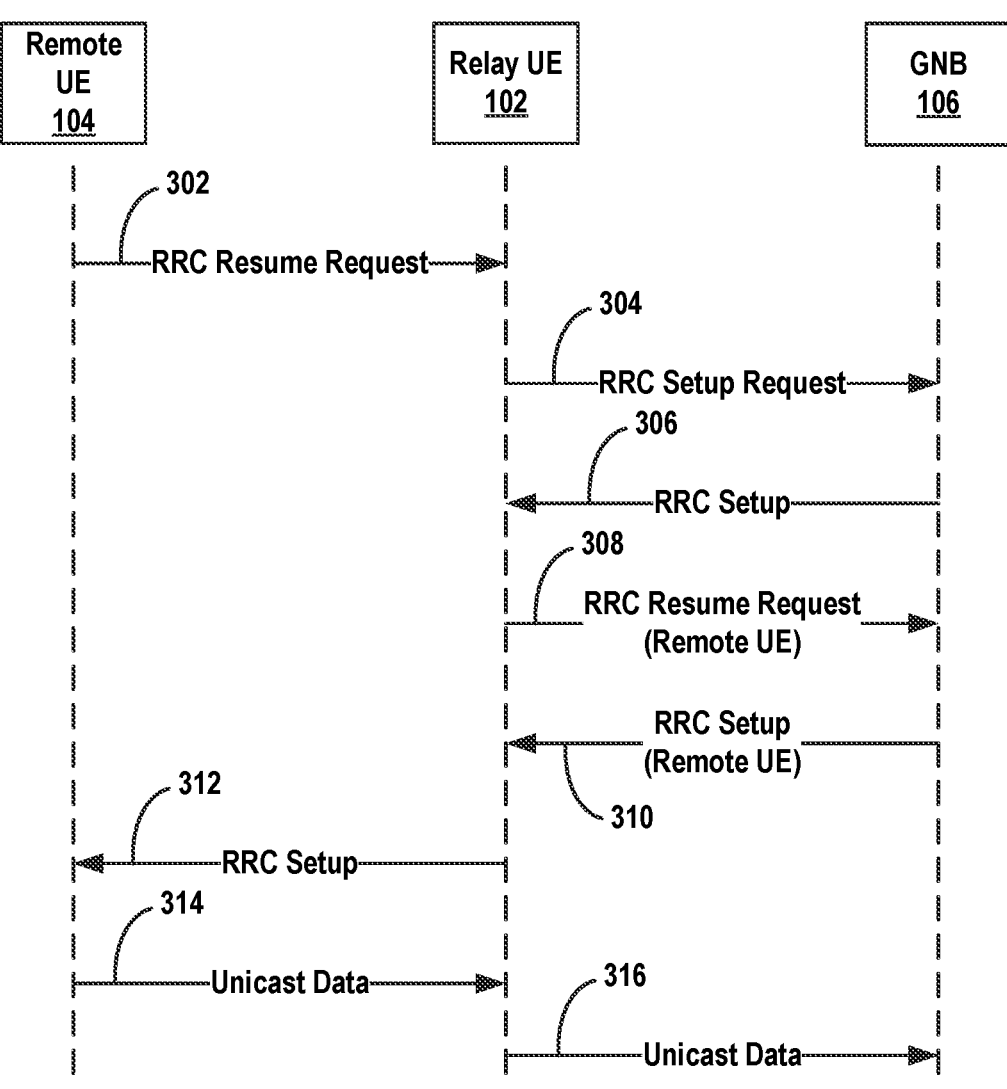
FIG. 3 is a messaging diagram of an example of the messages exchanged between the UE devices and the base station when the relay UE device successfully establishes a connection with the base station.

FIG. 3 is a messaging diagram of an example of the messages exchanged between the UE devices and the base station when the relay UE device successfully establishes a connection with the base station. For the example shown in FIG. 3, remote UE device 104 begins in the RRC_INACTIVE state with respect to base station 106, and relay UE device 102 begins in the RRC_IDLE state with respect to base station 106. In operation, remote UE device 104 transmits an RRC Resume Request message 302 to relay UE device 102. Since relay UE device 102 is not connected to base station 106, relay UE device 102 transmits an RRC Setup Request message 304 to base station 106.

Base station 106 responds by sending an RRC Setup message 306 to relay UE device 102. At this point, relay UE device 102 transitions to the RRC_CONNECTED state (with respect to base station 106) and forwards the RRC Resume Request 308 message, which was received from remote UE device 104, to base station 106. Base station 106 responds by sending an RRC Setup message 310 to be relayed by relay UE device 102 to remote UE device 104. Relay UE device 102 forwards message 310 as RRC Setup message 312 to remote UE device 104. In response to receiving message 312, remote UE device 104 transitions to the RRC_CONNECTED state (with respect to base station 106) and transmits unicast data 314 to relay UE device 102, which relay UE device 102 forwards to base station 102 as signal 316.

Figure 4:
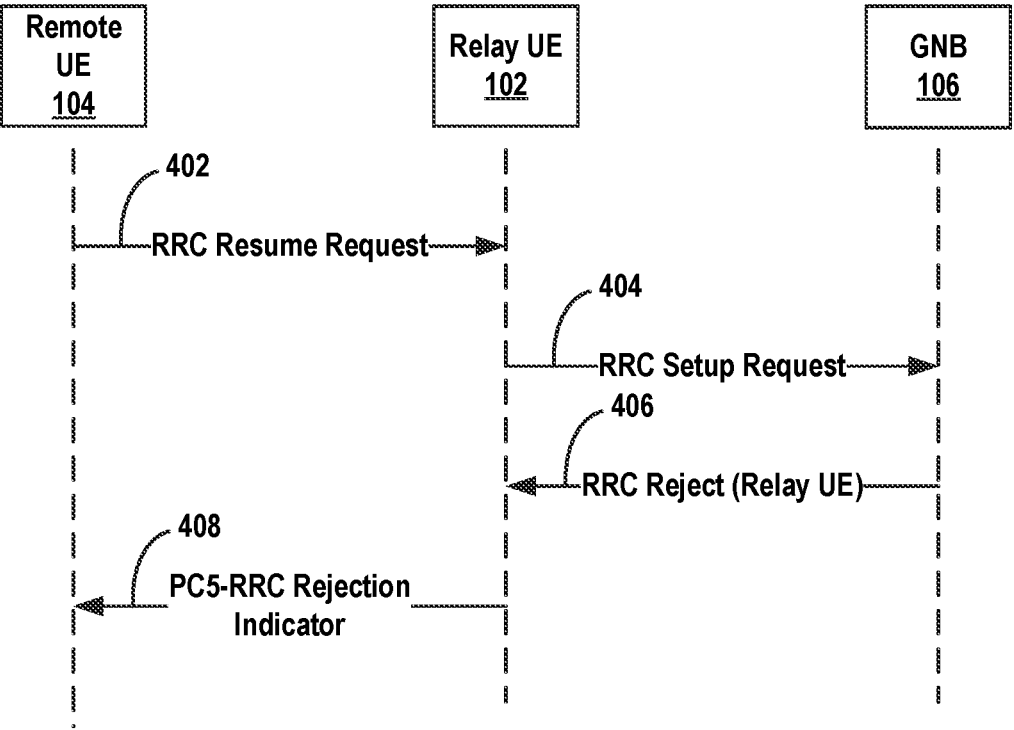
FIG. 4 is a messaging diagram of an example of the messages exchanged between the UE devices and the base station when the base station rejects the relay UE device's request to establish a connection with the base station.

FIG. 4 is a messaging diagram of an example of the messages exchanged between the UE devices and the base station when the base station rejects the relay UE device's request to establish a connection with the base station. For the example shown in FIG. 4, remote UE device 104 begins in the RRC_INACTIVE state with respect to base station 106, and relay UE device 102 begins in the RRC_IDLE state with respect to base station 106. In operation, remote UE device 104 transmits an RRC Resume Request message 402 to relay UE device 102. Since relay UE device 102 is not connected to base station 106, relay UE device 102 transmits an RRC Setup Request message 404 to base station 106.

In some cases, the relay UE device's connection failure may be due to reasons other than the reception of an RRC Reject message from the base station. For example, the relay UE device may experience Radio Link Failure (RLF) while it attempts to perform its own connection to the base station. This is different from the more common RLF scenario whereby the relay UE device is assumed to be connected to the base station while losing connection. In this case, the RLF occurs while the relay UE device attempts to perform connection to the base station. Regardless of whether the connection failure is due to the reception of RRC Reject or RLF, the end result is the failure for the relay UE device to connect to the base station. Therefore, the relay UE device needs to inform the remote UE device of the connection failure. However, for the case when the connection failure is due to the reception of RRC Reject, it is still possible that another access attempt may be made, especially if the relay UE device also receives a wait time indication as part of the RRC Reject message.

Base station 106 responds by sending an RRC Reject message 406 to relay UE device 102. At this point, relay UE device 102 remains in the RRC_IDLE state (with respect to base station 106) and transmits a PC5-RRC message 408 containing an RRC connection failure indicator. Upon receipt of message 408, remote UE device 104 remains in the RRC_INACTIVE state (with respect to base station 106). In some cases, remote UE device 104 may decide to perform relay reselection to find another relay UE device that may be camped on a different cell. The discovery message sent by the other relay UE device (and received by remote UE device 104) will contain the Cell ID of the cell on which the other relay UE device is camped.

Figure 5:
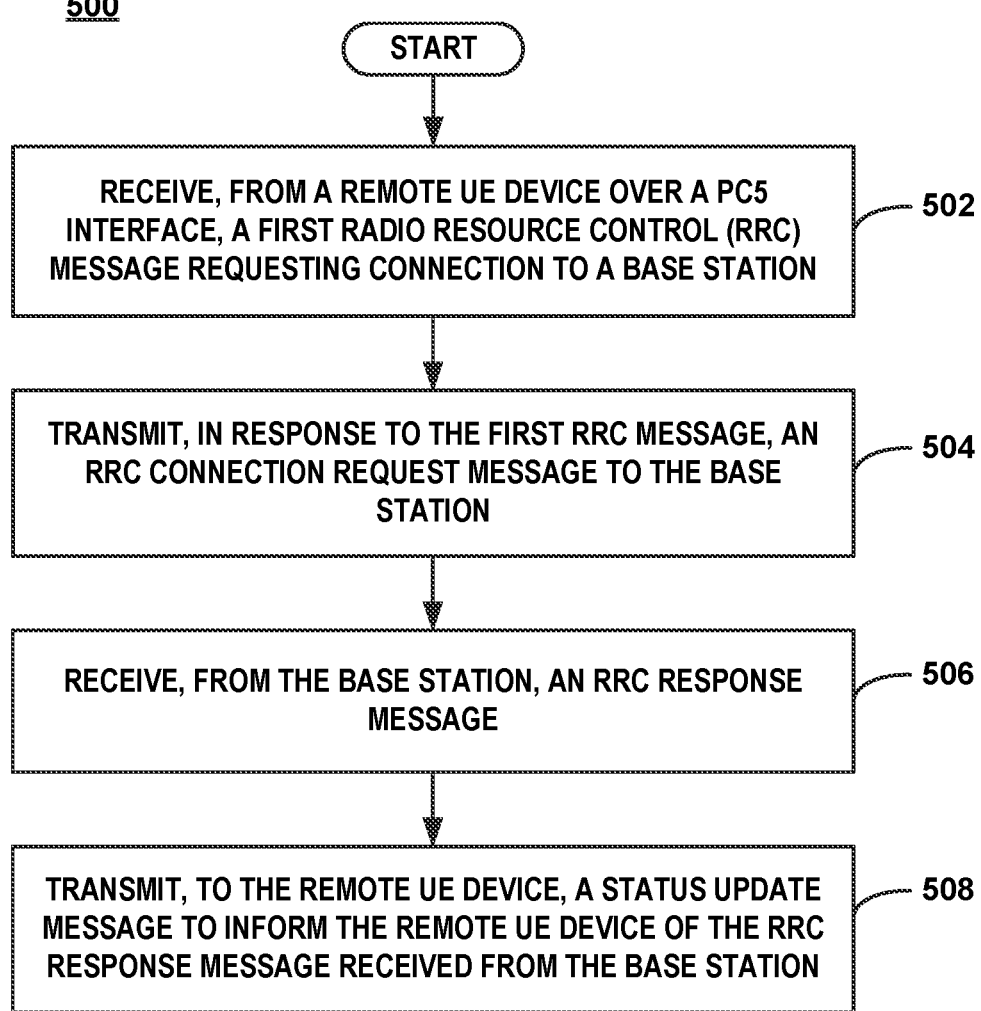
FIG. 5 is a flowchart of an example of a method in which a relay UE device receives, from a remote UE device, a first Radio Resource Control (RRC) message requesting connection to a base station. The relay UE device transmits an RRC connection request message to the base station and receives an RRC response message from the base station.

FIG. 5 is a flowchart of an example of a method in which a relay UE device receives, from a remote UE device, a first Radio Resource Control (RRC) message requesting connection to a base station. The relay UE device transmits an RRC connection request message to the base station and receives an RRC response message from the base station. The method 500 begins at step 502 with receiving, from a remote UE device over a PC5 interface, a first RRC message requesting connection to a base station. At step 504, the relay UE device transmits, in response to receiving the first RRC message, an RRC connection request message to the base station. At step 506, the relay UE device receives, from the base station, an RRC response message. At step 508, the relay UE device transmits, to the remote UE device, a status update message to inform the remote UE device of the RRC response message received from the base station. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A relay user equipment (UE) device comprising:
a receiver configured to receive, from a remote UE device over a PC5 interface, a first Radio Resource Control (RRC) message requesting connection to a base station; and
a transmitter configured to transmit, in response to the first RRC message, an RRC connection request message to the base station,
the receiver further configured to receive, from the base station, an RRC Reject message,
the transmitter further configured to transmit, to the remote UE device, a PC5-RRC message containing an RRC connection failure indicator.

2. The relay UE device of claim 1, wherein the transmitter is further configured to refrain from transmitting the RRC connection request message more than a maximum number of allowable times configured by the base station.

3. The relay UE device of claim 1, wherein the RRC Reject message comprises a wait time, the wait time indicating an amount of time that the relay UE device must wait before transmitting another RRC connection request message to the base station.

4. The relay UE device of claim 3, wherein the PC5-RRC message includes a relay wait time having a same value as the wait time, the relay wait time indicating an amount of time that the remote UE device must wait before transmitting another message requesting connection to the base station.

5. The relay UE device of claim 1, wherein the RRC Reject message comprises a wait time and a relay wait time, the relay wait time indicating an amount of time that the remote UE device must wait before transmitting another message requesting connection to the base station.

6. The relay UE device of claim 5, wherein the PC5-RRC message includes the relay wait time.

7. A remote user equipment (UE) device comprising:
a transmitter configured to transmit, to a relay UE device over a PC5 interface, a first Radio Resource Control (RRC) message requesting connection to a base station; and
a receiver configured to receive, from the relay UE device, a PC5-RRC message containing an RRC connection failure indicator.

8. The remote UE device of claim 7, wherein the transmitter is permitted to transmit additional messages requesting connection to the base station when a number of times that the remote UE device has transmitted the first RRC message requesting connection to the base station is less than a maximum number of allowable connection attempts configured by the base station.

9. The remote UE device of claim 7, wherein the PC5-RRC message includes a relay wait time, the relay wait time indicating an amount of time that the remote UE device must wait before transmitting another message requesting connection to the base station.

10. A method for a relay user equipment (UE) device, the method comprising:
receiving, from a remote UE device over a PC5 interface, a first Radio Resource Control (RRC) message requesting connection to a base station;
transmitting, in response to the first RRC message, an RRC connection request message to the base station;
receiving, from the base station, an RRC Reject message; and
transmitting, to the remote UE device, a PC5-RRC message containing an RRC connection failure indicator.

11. The method of claim 10, further comprising:
refraining from transmitting the RRC connection request message more than a maximum number of allowable times configured by the base station.

12. The method of claim 10, wherein the RRC Reject message comprises a wait time, the wait time indicating an amount of time that the relay UE device must wait before transmitting another RRC connection request message to the base station.

13. The method of claim 12, wherein the PC5-RRC message includes a relay wait time having a same value as the wait time, the relay wait time indicating an amount of time that the remote UE device must wait before transmitting another message requesting connection to the base station.

14. The method of claim 10, wherein the RRC Reject message comprises a wait time and a relay wait time, the relay wait time indicating an amount of time that the remote UE device must wait before transmitting another message requesting connection to the base station.

15. The method of claim 14, wherein the PC5-RRC message includes the relay wait time.

16. A method for a remote user equipment (UE) device, the method comprising:

transmitting, to a relay UE device over a PC5 interface, a first Radio Resource Control (RRC) message requesting connection to a base station; and receiving, from the relay UE device, a PC5-RRC message containing an RRC connection failure indicator.

17. The method of claim 16, further comprising:

transmitting additional messages requesting connection to the base station when a number of times that the remote UE device has transmitted the first RRC message requesting connection to the base station is less than a maximum number of allowable connection attempts configured by the base station.

12

18. The method of claim 16, wherein the PC5-RRC message includes a relay wait time, the relay wait time indicating an amount of time that the remote UE device must wait before transmitting another message requesting connection to the base station.

19. A system comprising a relay user equipment (UE) device and a remote UE device, wherein:

the remote UE device is configured to transmit, to the relay UE device over a PC5 interface, a first Radio Resource Control (RRC) message requesting connection to a base station;

the relay UE device is configured to receive, from the remote UE device over the PC5 interface, the first RRC message;

the relay UE device is configured to transmit, in response to the first RRC message, an RRC connection request message to the base station;

the relay UE device is configured to receive, from the base station, an RRC Reject message, the relay UE device is configured to transmit, to the remote UE device, a PC5-RRC message containing an RRC connection failure indicator; and the remote UE device is configured to receive, from the relay UE device, the PC5-RRC message.

* * * * *